US010715410B2

(12) United States Patent
Schmogrow et al.

(10) Patent No.: US 10,715,410 B2
(45) Date of Patent: Jul. 14, 2020

(54) CONNECTIVITY VERIFICATION TESTING AND TOPOLOGY DISCOVERY

(71) Applicant: Google LLC, Mountain View, CA (US)

(72) Inventors: Rene Schmogrow, San Jose, CA (US); Matthew Newland, San Jose, CA (US)

(73) Assignee: Google LLC, Mountain View, CA (US)

( * ) Notice: Subject to any disclaimer, the term of this patent is extended or adjusted under 35 U.S.C. 154(b) by 84 days.

(21) Appl. No.: 16/039,030

(22) Filed: Jul. 18, 2018

(65) Prior Publication Data

US 2020/0028765 A1 Jan. 23, 2020

(51) Int. Cl.
*H04L 12/26* (2006.01)
*H04J 14/02* (2006.01)
*H04L 5/00* (2006.01)
*H04L 12/751* (2013.01)

(52) U.S. Cl.
CPC ...... *H04L 43/0811* (2013.01); *H04J 14/0212* (2013.01); *H04L 5/0053* (2013.01); *H04L 45/02* (2013.01)

(58) Field of Classification Search
None
See application file for complete search history.

(56) References Cited

U.S. PATENT DOCUMENTS

| | | | |
|---|---|---|---|
| 7,142,746 B2 | 11/2006 | Look | |
| 9,660,755 B2 | 5/2017 | Hurley et al. | |
| 2015/0208146 A1* | 7/2015 | Younce | H04Q 11/0066 398/21 |
| 2016/0099851 A1* | 4/2016 | Archambault | H04J 14/0212 398/16 |
| 2017/0099099 A1* | 4/2017 | Papakos | H04J 14/021 |
| 2018/0295430 A1* | 10/2018 | Younce | H04Q 11/0066 |

\* cited by examiner

*Primary Examiner* — David W Lambert
(74) *Attorney, Agent, or Firm* — Lerner, David, Littenberg, Krumholz & Mentlik, LLP

(57) ABSTRACT

Systems and methods for performing connectivity verification testing and topology discovery in a reconfigurable optical add/drop multiplexer (ROADM) are provided. The ROADM can include a ROADM block having a plurality of internal ports connected to a fiber shuffle via respective optical fibers. The ROADM block includes a test signal transmitter configured to inject an outgoing test signal having a unique signature into each internal port. The outgoing test signals are out-of-band of optical data signals traversing the ROADM. The ROADM block includes a test signal monitor configured to monitor for incoming test signals at each of the internal ports. The test signal monitor is configured to validate, based on a signature of an incoming test signal received at an internal port of the ROADM block, whether a valid connection exists between the internal port and an internal port of a second ROADM block.

25 Claims, 7 Drawing Sheets

600 

Inject a first outgoing test signal having a first signature into a first internal port of a first ROADM block
610

Inject a second outgoing test signal having a second signature into a second internal port of the first ROADM block
620

Monitor for an incoming test signal at each of the internal ports
630

Verify, based on receiving the incoming test signal at a third internal port, whether a valid first connection exists between the third internal port and an internal port of a second ROADM block
640

FIG. 6

CONNECTIVITY VERIFICATION TESTING AND TOPOLOGY DISCOVERY

BACKGROUND

Reconfigurable optical add/drop multiplexers (ROADMs) perform routing, adding, and dropping of optical signal in an optical line system. A ROADM can switch traffic of a wavelength-division multiplexing (WDM) system at the wavelength layer. For example, the ROADM can add, drop, or route individual or multiple wavelengths carrying data without the need to convert the optical signals from the optical domain to the electronic domain and back.

SUMMARY

At least one aspect is directed to a system for performing connectivity verification testing and topology discovery in a reconfigurable optical add/drop multiplexer (ROADM). The system includes a first ROADM block of a plurality of ROADM blocks. Each ROADM block is a ROADM degree or an add/drop block. The first ROADM block includes a first plurality of internal ports including at least a first internal port, a second internal port, and a third internal port, each connected to another ROADM block via respective optical fibers. The first ROADM block includes a test signal transmitter configured to inject a first outgoing test signal having a first signature into the first internal port and a second outgoing test signal having a second signature different from the first signature into the second internal port. The first outgoing test signal and second outgoing test signal are out-of-band of optical data signals traversing the ROADM. The first ROADM block includes a test signal monitor configured to monitor for incoming test signals at each of the plurality of internal ports. The test signal monitor is configured to validate, based on a signature of an incoming test signal received at the third internal port of the first ROADM block, that a valid first connection exists between the third internal port of the first ROADM block and a first internal port of a second plurality of internal ports of a second ROADM block.

At least one aspect is directed to a method of performing connectivity verification testing and topology discovery in a reconfigurable optical add/drop multiplexer (ROADM). The method includes injecting, using a test signal transmitter of a first ROADM block of a plurality of ROADM blocks, a first outgoing test signal having a first signature into a first internal port of a first plurality of internal ports and a second outgoing test signal having a second signature different from the first signature into a second internal port of the first plurality of internal ports. The first outgoing test signal is out-of-band of optical data signals traversing the ROADM. The method includes monitoring, using a test signal monitor of the first ROADM block, for an incoming test signal at each of the plurality of internal ports. The method includes verifying, based on receiving the incoming test signal at the third internal port, that a valid first connection exists between the third internal port and a first internal port of a second plurality of internal ports of a second ROADM block. The first internal port, the second internal port, and the third internal port are each connected to another ROADM block via respective optical fibers.

At least one aspect is directed to a non-transitory computer-readable medium having stored thereon instructions configured to cause one or more processors to execute a method of performing connectivity verification testing and topology discovery in a reconfigurable optical add/drop multiplexer (ROADM). The method includes injecting, using a test signal transmitter of a first ROADM block of a plurality of ROADM blocks, a first outgoing test signal having a first signature into a first internal port of a first plurality of internal ports and a second outgoing test signal having a second signature different from the first signature into a second internal port of the first plurality of internal ports. The first outgoing test signal is out-of-band of optical data signals traversing the ROADM. The method includes monitoring, using a test signal monitor of the first ROADM block, for an incoming test signal at each of the plurality of internal ports. The method includes verifying, based on receiving the incoming test signal at the third internal port, that a valid first connection exists between the third internal port and a first internal port of a second plurality of internal ports of a second ROADM block. The first internal port, the second internal port, and the third internal port are each connected to another ROADM block via respective optical fibers.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 6 a flowchart of an example method of performing connectivity verification testing and topology discovery in a ROADM, according to an illustrative implementation.

DETAILED DESCRIPTION

Figure 1:
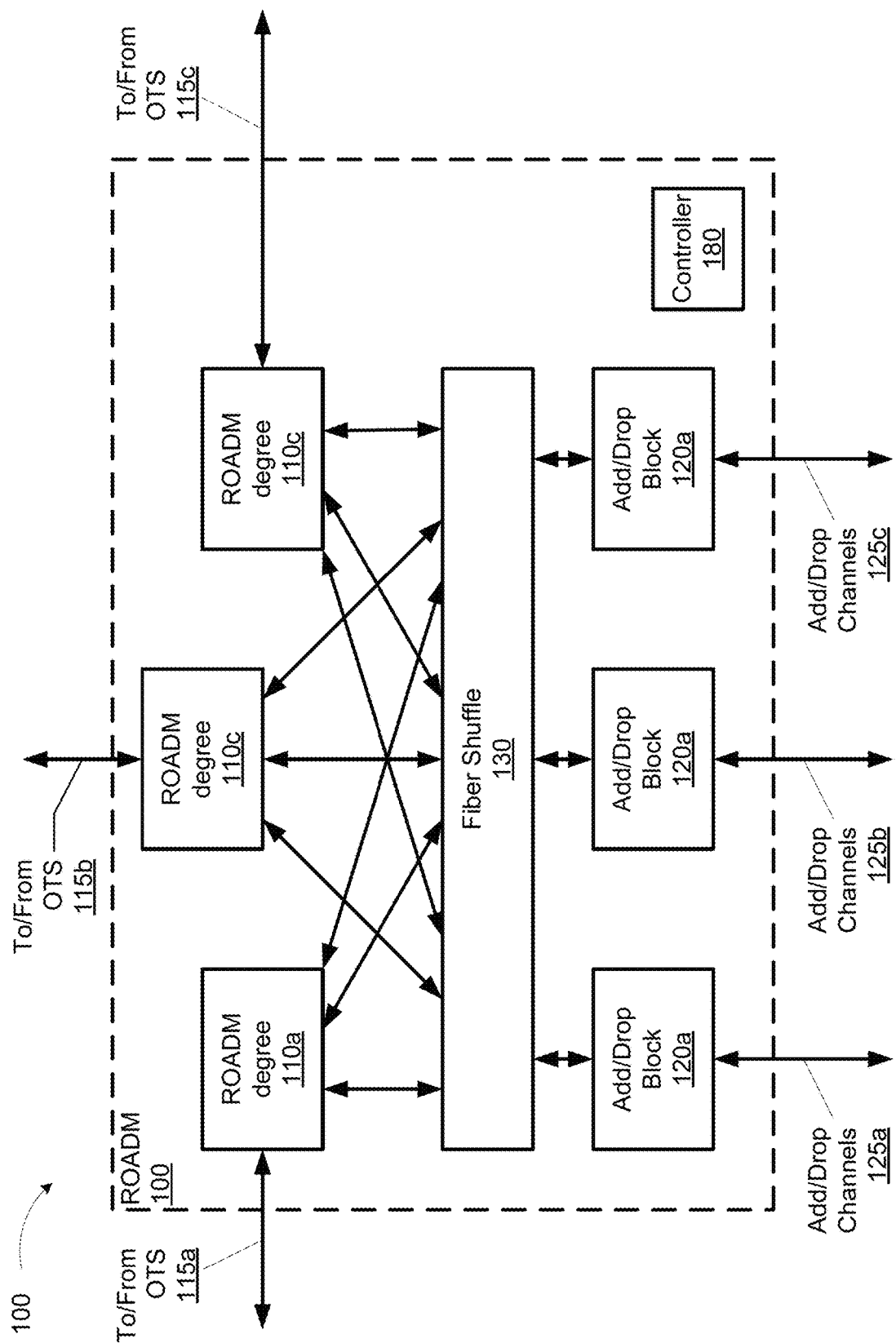
FIG. 1 is a block diagram of a reconfigurable optical add/drop multiplexer (ROADM), according to an illustrative implementation.

Systems and methods of this disclosure relate generally to performing connectivity verification testing (CVT) and topology discovery in a reconfigurable optical add/drop multiplexer (ROADM). A ROADM can switch traffic of a wavelength-division multiplexing (WDM) system at the wavelength layer. For example, the ROADM can add, drop, or route individual or multiple wavelengths carrying data without the need to convert the signals on all of the WDM optical signal channels from the optical domain to the electronic domain and back.

The ROADM can be made up of several blocks including one or more ROADM degrees and one or more add/drop blocks, where the ROADM degrees and add/drop blocks are interconnected via optical fibers connected through a fiber shuffle. The optical cabling between the ROADM degrees, add/drop blocks, and the fiber shuffle is typically manually routed. In some implementations, the optical cabling can be routed directly between the ROADM degrees and add/drop blocks. The use of fiber shuffles, however, allows the use of multi-fiber cables. As the degree count of a ROADM increases, it can become difficult to map and verify each connection within the ROADM. This difficulty can increase if the ROADM is disaggregated; that is, if the degrees and blocks of the ROADM reside in separate rooms or buildings. Additional difficulties in mapping and verifying each connection arise when the ROADM includes degrees and add/drop blocks from different vendors.

The systems and methods of this disclosure provide for an automated CVT process that can be performed among disaggregated ROADM degrees and add/drop blocks without the need for centralized control of the process. For example, each ROADM degree and add/drop block can be provided with a test signal transmitter and/or a test signal monitor. The test signal transmitter can transmit an out-of-band optical test signal having a certain signature or pattern. The test signal monitor can monitor for the test signal. Using a test signal that is out-of-band allows for testing connections without having to disrupt optical data flows within and through the ROADM. Each test signal transmitter can be autonomous or locally controlled—that is, controlled from within the degree or block in which the test signal transmitter resides—to sequentially inject a test signal through each port connected to the fiber shuffle. The test signal transmitter can send a test signal having a different signature through each port. Similarly, each test signal monitor can be autonomous or locally controlled—that is, controlled from within the degree or block in which the test signal monitor resides—to cycle through each port connected to the fiber shuffle and monitor for a test signal. When a test signal monitor detects a test signal, it can determine the port and degree or add/drop block from which the test signal originated based on the signature of the test signal. The test signal monitor can additionally detect a loss of the connection, which it can infer based on a drop in the received power. By adjusting the relative timing of the port cycling of test signal transmission and port cycling of test signal monitoring, the system can ensure that the test signal will be transmitted through each port for a duration long enough that each test signal monitor can cycle through each possible port that can receive the test signal. For example, if an add/drop block has 16 internal ports, the test signal monitor can be configured to monitor each port sequentially for 1 millisecond, and a degree can be configured to transmit a test signal from each port for at least 16 milliseconds, giving the test signal monitor adequate time to check each port for the test signal. In some implementations, more or fewer internal ports can be monitored, and the transmissions and monitoring durations can differ.

Each test signal monitor can provide data indicative of connection status. The test signal monitors can provide the data in several manners. For example, the test signal monitors can provide an on-demand report of all connections and their respective statuses. Such an operation would not require the test signal monitors to maintain any stateful information. In another example, the test signal monitors can provide an alert if an expected connection is not found.

FIG. 1 is a block diagram of a reconfigurable optical add/drop multiplexer (ROADM) 100, according to an illustrative implementation. The ROADM 100 includes three ROADM degrees 110a-110c (collectively "ROADM degrees 110"). In some implementations, the ROADM 100 can include more or fewer ROADM degrees 110. The ROADM 100 includes three add/drop blocks 120a-120c (collectively "add/drop blocks 120"). In some implementations, the ROADM 100 can include more or fewer add/drop blocks 120. The ROADM degrees 110 and the add/drop blocks 120 can be referred to generically as ROADM blocks, as certain aspects of this disclosure can apply to, or be implemented by, either or both types of blocks. In some implementations, the ROADM 100 can optionally include a controller 180 for coordinating the operation of the ROADM 100 and its components. In some implementations, control can be performed locally within each ROADM block, as described further below. In some implementations, the ROADM 100 can include a fiber shuffle 130. The fiber shuffle 130 can include passive optical connectors for simplifying routing of optical cabling of the ROADM 100; however, it is possible to route cables among the ROADM degrees 110 and add/drop blocks 120 directly and without use of the fiber shuffle. In some implementations, the ROADM 100 can be disaggregated; that is, the ROADM blocks may be provided by different vendors and/or housed in different rooms or buildings. Optical fiber connections between the ROADM blocks and the fiber shuffle 130 are typically installed and maintained manually. Such manual routing can be prone to poor connections and misconnections. Aspects of this disclosure can provide for connectivity verification testing (CVT), which involves testing connections, and topology discovery, which involves automatically mapping the connections between ROADM blocks.

Each ROADM degree 110 connects to a next-hop network element over an optical transmission section (OTS) connection via the optical fiber links 115a-115c (collectively "optical fiber links 115"). Each ROADM degree 110 can send and receive wavelength-division multiplexed (WDM) optical signals over the optical fiber links 115. Each ROADM degree 110 can demultiplex the WDM optical signal received at its optical fiber link 115 and transmit each individual optical channel signal to the appropriate destination; e.g., another ROADM degree 110 or an add/drop block 120a. Similarly, each ROADM degree 110 can receive individual optical channel signals from other ROADM degrees 110 and add/drop blocks 120, multiplex them into a WDM optical signal, and transmit the WDM optical signal over the optical fiber links 115.

Each add/drop block 120 can send and receive individual add/drop optical channel signals via the optical fiber links 125a-125c (collectively "optical fiber links 125"). The ROADM 100 can add an individual optical channel signal received at the optical fiber link 125 to a WDM optical signal transmitted from one of the optical fiber links 115. Similarly, the ROADM 100 can break out an individual optical channel signal from a WDM optical signal received at one of the optical fiber links 115, and transmit the individual optical channel signal via an optical fiber link 125.

The ROADM 100 can therefore perform, without limitation, four basic functions: (1) a same-direction express function (e.g., conveying an optical channel signal from optical fiber link 115a to optical fiber link 115c); (2) a different-direction express function (e.g., conveying an optical channel signal from optical fiber link 115a to optical fiber link 115*b*); (3) add an optical channel signal to a WDM optical signal (add function); and (4) break out an individual optical channel signal from a WDM optical signal (drop function). The ROADM 100 can perform additional functions such as optical signal power detection, optical signal amplification, and optical signal equalization. In some implementations, the ROADM can additionally include features for performing open- or closed-loop feedback control of optical signal total power and power spectral density. In some implementations, the ROADM can include features for performing connectivity verification testing and/or topology discovery. These additional functions and the structures that facilitate them are described in further detail below with regard to FIGS. 2-6.

The ROADM 100 can be a colorless-directionless-contentionless architecture. Colorless means that the ROADM 100 can send or receive any wavelength on any port. Directionless means that the ROADM 100 can route a wavelength across any connected fiber path (also called degree). Contentionless means that the ROADM 100 can add or drop two optical signals having the same wavelength (i.e., an optical signal will not block another optical signal having the same wavelength) if they are destined for different fiber paths.

The controller 180 can coordinate the functions of the ROADM 100 and its components. In some implementations, the controller 180 can include a single central processing unit that can monitor and control each module or block of the ROADM 100 including the ROADM degrees 110 and the add/drop blocks 120. The controller 180 can interface with controllers 280 and 380 of each ROADM block for the purpose of performing the operations described herein, including connectivity verification testing, topology discovery, and issuing reports and/or alerts. The controller 180 can provide access to one or more clients for the monitoring and control of the ROADM 100. In some implementations, the controller 180 can include distributed processors local to each block or module for performing local monitoring and control of the block or module. In some implementations, the controller 180 can include a combination of central and distributed components. In some implementations, components of the controller 180 may be collocated with one or more blocks of the ROADM 100. In some implementations, the components of the controller 108 may be located remotely from the blocks of the ROADM 100; for example, in another room or building. The controller 180 can be implemented in, or include, one or more computer systems such as the computer system 900 described in more detail below with regard to FIG. 7.

Figure 2:
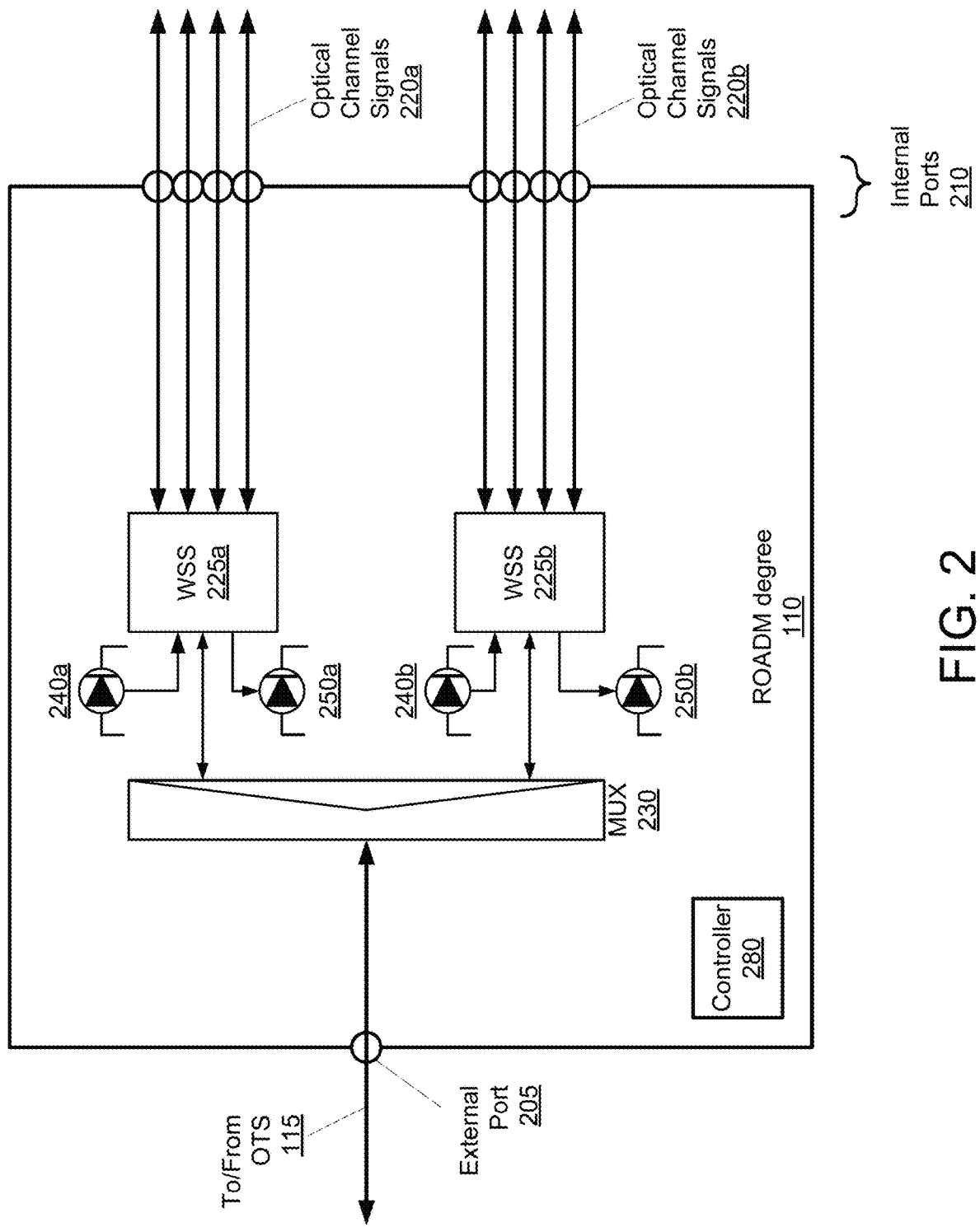
FIG. 2 is a block diagram of a ROADM degree of a ROADM, according to an illustrative implementation.

FIG. 2 is a block diagram of a ROADM degree 110 of the ROADM 100, according to an illustrative implementation. The ROADM degree 110 can receive a WDM optical signal via the optical fiber link 115 at an external port 205. The ROADM degree 110 can demultiplex the WDM optical signal into individual optical channel signals, and send them to another ROADM degree 110 or an add/drop block 120 through internal ports 210 and over optical fiber links 220*a* and 220*b* (collectively "optical fiber links 220"). The ROADM degree 110 can also multiplex optical channel signals received from other ROADM degrees 110 or the add/drop blocks 120 via optical fiber links 220 at internal ports 210. The ROADM degree 110 can multiplex the optical channel signals into a second WDM optical signal, and transmit the second WDM optical signal via the external port 205 and the optical fiber link 115.

The ROADM degree 110 includes a controller 280. The controller 280 can control the various functions of the test signal transmitters 240 and the test signal monitors 250, as described in more detail below. The controller 280 can also control operation of the WSS blocks 225 for the purpose of connecting the test signal transmitter 240 and the test signal monitor 250 to the internal ports. The controller 280 can control the timing of the switching, as described in more detail below with regard to FIGS. 4 and 5. The controller 280 can interface with the controller 180 of the ROADM 100 for the purpose of performing the operations described herein, including connectivity verification testing, topology discovery, and issuing reports and/or alerts. The controller 280 can be implemented in, or include, one or more computer systems such as the computer system 900 described in more detail below with regard to FIG. 7.

The ROADM degree 110 includes one or more wavelength-selective switch (WSS) blocks 225*a* and 225*b* (collectively "WSS blocks 225"). The WSS block 225 can demultiplex a WDM optical signal into individual optical channel signals. The WSS block 225 can route any individual optical channel signals to any port. The WSS block 225 can also multiplex individual optical channel signals into a WDM optical signal. In some implementations, the ROADM 100 can handle optical signals in more than one frequency or wavelength band. In some implementations, the ROADM 100 can handle optical signals in both the C-band and the L-band. The ROADM degree 110 can include a WSS block 225*a* for multiplexing and demultiplexing C-band optical channel signals, and a WSS block 225*b* for multiplexing and demultiplexing L-band optical channel signals. In implementations of the ROADM degree 110 that include multiple WSS blocks 225, the ROADM degree 110 can include a multiplexer/demultiplexer (MUX) (also referred to as a C/L band splitter/combiner) 230. The MUX 230 can multiplex and demultiplex two or more WDM optical signals carrying optical channel signals in different frequency bands.

Each WSS block 225 can be associated with a test signal transmitter 240*a* and 240*b* (collectively "test signal transmitters 240"). In some implementations, a single test signal transmitter 240 can provide outgoing test signals to more than one WSS block 225. The controller 280 can control the test signal transmitter 240 and the WSS blocks 225 to inject an outgoing test signal into each of the internal ports associated with the WSS blocks 225. The outgoing test signal is out-of-band of the optical data signals traversing the ROADM 100. The WSS blocks 225 can route the outgoing test signal to each of its outputs, and thus to each of the internal ports 210. The test signal transmitter 240 can apply a unique signature to the outgoing test signal sent from each internal port 210. That is, when monitoring connections to each of the internal port 210, a particular internal port can be identified by the signature of the outgoing test signal detected on a particular connection. The WSS blocks 225 can sequentially route the outgoing test signal through each of the internal ports 210 in turn. In some implementations, the outgoing test signal signatures can be amplitude or phase modulated onto an optical carrier of the test signal at a frequency of less than, for example, 100 MHz. In some implementations, the outgoing test signal signatures can be amplitude or phase modulated onto the optical carrier of the test signal at a frequency of less than 10 MHz. In some implementations, the outgoing test signal signatures can be amplitude or phase modulated onto the optical carrier of the test signal at a frequency of less than 1 MHz. This keeps the outgoing test signals well out-of-band of the optical signals traversing the ROADM 100. The relatively low frequency of modulation of the outgoing test signal also allows for the use of simple and inexpensive circuitry and components for generating, transmitting, and detecting the test signals.

Each WSS block 225 can be associated with a test signal monitor 250a and 250b (collectively "test signal monitor 250"). In some implementations, a single test signal monitor 250 can monitor for incoming test signals at more than one WSS block 225. The test signal monitor 250 is configured to monitor for incoming test signals at each of the internal ports 210. The controller 280 can control the test signal monitor 250 and the WSS blocks 225 to sequentially route incoming test signals from each internal port 210 to the test signal monitor 250. The controller 280 and the test signal monitor 250 can validate, based on a signature of the incoming test signal received at a particular internal port, whether a valid connection exists between the internal port and a particular internal port of a second ROADM block.

In some cases, the test signal monitor 250 can receive an incoming test signal with a signature that matches a signature of an outgoing test signal sent by the test signal transmitter 240 in the same ROADM degree 110. Detecting a test signal generated in the same ROADM degree 110 can indicate a "loop-back" connection, which is a connection from a ROADM degree 110, to the fiber shuffle 130, and back to the same ROADM degree 110. Such loop-back connections can be used to the fill extra internal ports 210 of the ROADM degree 110 until such time as they are ready to be connected to other ROADM blocks. Thus, an incoming test signal received at a ROADM degree 110 can originate as an outgoing test signal from at least (1) the same ROADM degree 110, (2) a different ROADM degree 110, or (3) an add/drop block 120.

In some implementations, the test signal monitor 250 can measure an amplitude of the incoming test signal. The test signal monitor 250 indicate a misconnection if the test signal amplitude is below a threshold. In some implementations, the test signal monitor 250 can provide an indication of a weak signal. For example, the test signal monitor 250 can indicate that an expected incoming test signal is not detected ("fail"), that the incoming test signal is detected but has an amplitude below the threshold and thus requires investigation and maintenance ("weak"), or that the incoming test signal is detected and has an amplitude above the threshold ("good"). In some implementations, the test signal monitor 250 can operate in a stateless fashion; that is, it may have no information about what connections do or should exist. In such implementations, the test signal monitor 250 can indicate that an internal port is receiving no signal, a weak signal (with or without a signature identification), or a good signal (with signature identification).

Timing of the injecting of the outgoing test signal at each internal port 210, and timing of the monitoring for an incoming test signal at each internal port 210, can be configured to allow for the test signal monitor 250 to check each internal port 210 for an incoming test signal while a test signal transmitter 240 transmits an outgoing test signal at a single internal port 210. In other words, the test signal transmitter 240 can transmit an outgoing signal having a particular signature from a particular internal port 210 for a long enough duration of time that each test signal monitor 250 has time to check each of the internal ports 210 that it monitors.

The test signal transmitters 240 and test signal monitors 250 can operate in either a synchronous mode or an asynchronous mode. In the synchronous mode, each test signal transmitter 240 can transmit an outgoing test signal through an internal port 210 starting at or very near the same time, hold the outgoing test signal for the same duration of time, and switch to a different internal port 210 at or very near the same time. In asynchronous mode, there need be no fixed relationship between the timing of each test signal transmitter 240. Synchronous and asynchronous operation are described further below with reference to FIGS. 4 and 5, respectively.

Figure 3:
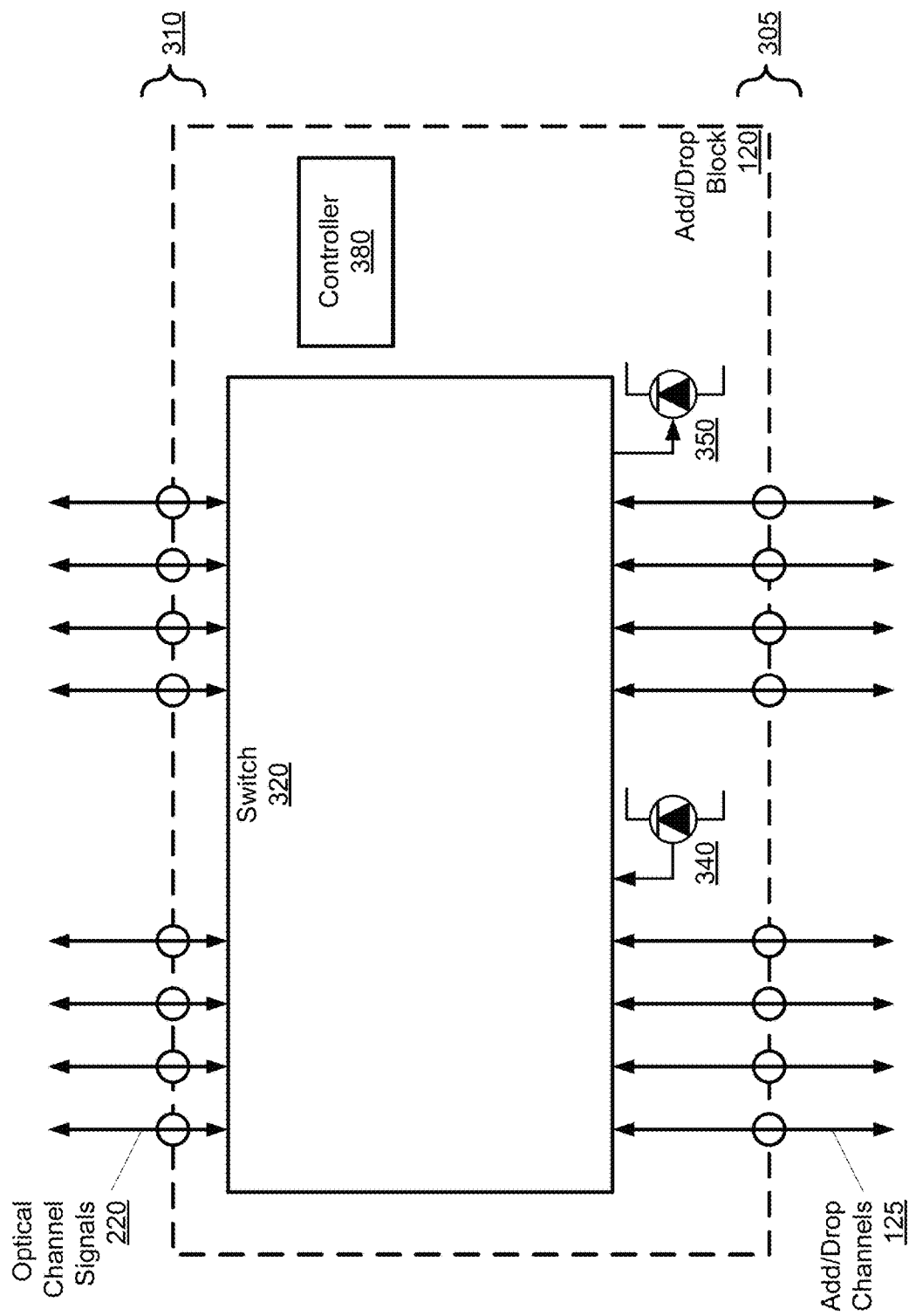
FIG. 3 is a block diagram of an add/drop block of a ROADM, according to an illustrative implementation.

FIG. 3 is block diagram of an add/drop block 120 for use in a ROADM 100, according to an illustrative implementation. The add/drop block 120 can receive optical channel signals 220 at internal ports 310 over the optical fiber links 220, and route them to optical fiber links 125 carrying add/drop channels via external ports 305. Breaking out an individual optical channel signal from the WDM optical signal can be referred to as drop functionality. The add/drop block 120 can receive optical channel signals at the external ports 305 over the optical fiber links 125, and route them to optical fiber links 220 via the internal ports 310. Adding an individual optical channel signal to a WDM optical signal can be referred to as add functionality. The add/drop block 120 includes a switch 320, a test signal transmitter 340, and a test signal monitor 350. The test signal transmitter 340 can be similar in form and function to the test signal transmitter 240 previously described. Likewise, the test signal monitor 350 can be similar in form and function to the test signal monitor 250 previously described. The controller 380 can be similar to the controller 280 previously described, with homologous structural an operational relationships with the test signal transmitter 340, test signal monitor 350, and the ROADM 100 controller 180.

The switch 320 can be a multicast switch, a contentionless wavelength-selective switch, a combination of a wavelength-selective switch and a spatial switch, or a combination of one or more of these. The switch 320 can have a dedicated port from which it receives the outgoing test signal from the test signal transmitter 340. The switch 320 can have a dedicated port to which it routes incoming test signals to a test signal monitor 350. While it would also be possible to provide a test signal generator and test signal monitor for each port, doing so would increase cost, size, and complexity due to providing generation and detection circuitry for each port. Additionally, the taps used to detection of the test signal shunt some optical power away from the optical data signal traversing the ROADM 100. Thus, it may be preferable to provide test signal transmitters and test signal monitors only at dedicated ports of the WSS blocks 225 and/or the switch 320 so as not to disrupt optical data signals.

In some implementations, the controller 180 of the ROADM 100 can issue alerts or reports regarding the status of individual connections or all connections. The reports can be generated on demand or on a schedule. Alerts can be issued as connection failures, weak connections, unexpected connections, or other issues potentially requiring attention are detected.

In some implementations, the controller 180 can maintain state information regarding ROADM 100 connections. The controller 180 can include issuing an alert if a state of the ROADM connections changes. In some implementations, the controller 180 is configured to provide a report indicating how to obtain a desired state of ROADM 100 connections. For example, the controller 180 can generate instructions on how to route or reroute the optical cabling between the various ROADM blocks to create or restore the desired topology.

In some implementations, the controller 180 can instruct the test signal monitors 250 and 350 to initiate a test and provide a report of state information regarding ROADM 100 connections to the controller 280.

Figure 4:
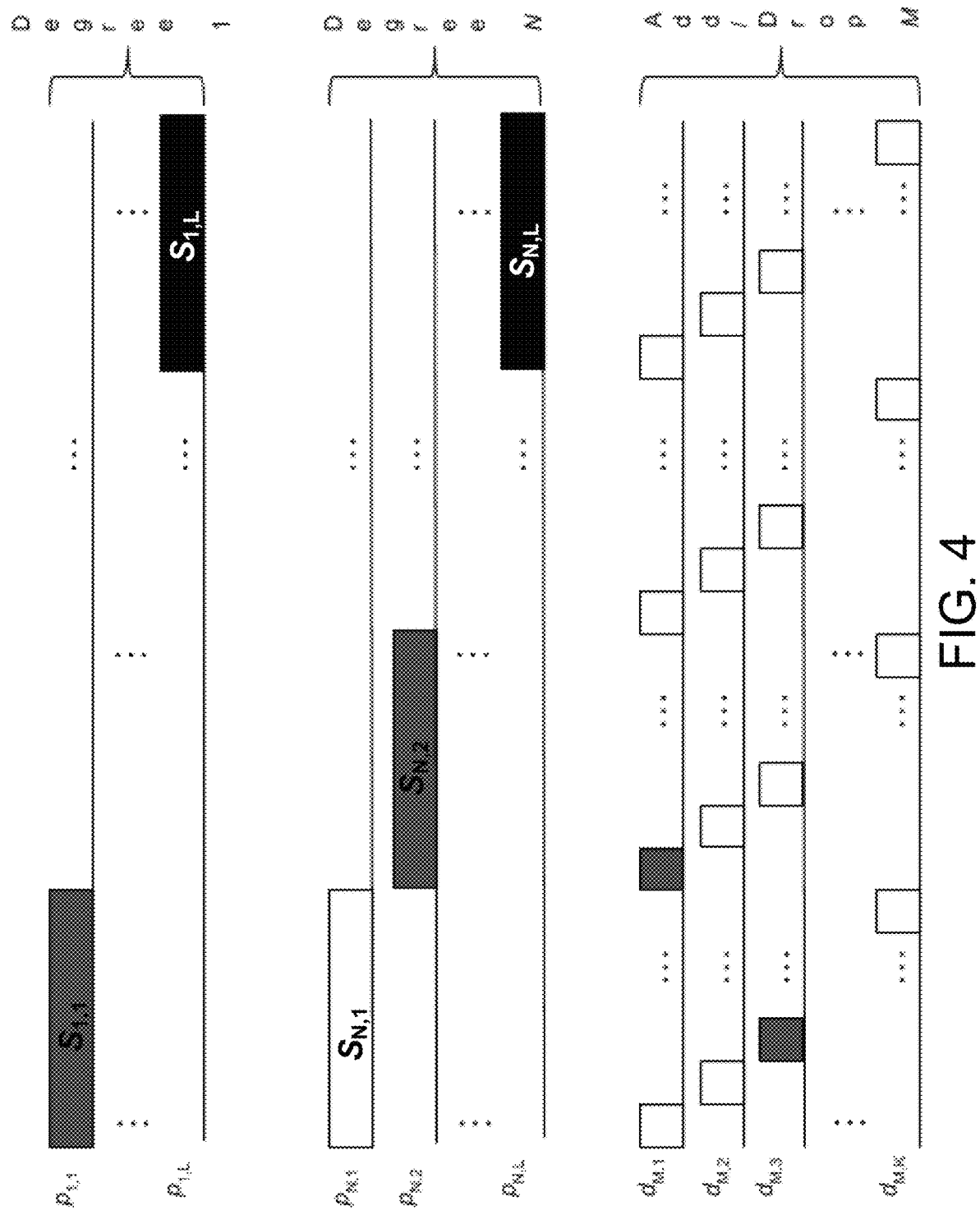
FIG. 4 is a timing diagram of a ROADM performing connectivity verification testing in a synchronous mode, according to an illustrative implementation.

FIG. 4 is a timing diagram of a ROADM 100 performing connectivity verification testing in a synchronous mode, according to an illustrative implementation. In the synchronous mode, each test signal transmitter will transmit an outgoing test signal through an internal port starting at or very near the same time, hold the outgoing test signal for the same duration of time, and switch to a different internal port at or very near the same time. In synchronous operation, a frequency with which the internal ports are switched is shows to equal K times less than the frequency with which the receive ports are switched: $f_L \leq f_K/K$, where $f_L$ is the frequency with which the test signal monitor cycles through internal ports for transmission of the test signal, and $f_K$ is the frequency with which the test signal transmitter cycles through internal ports for detection of the test signal. In other words, the test signal is routed to a specific internal port and kept there for a duration sufficient to allow all ports on the receiving ROADM blocks to be cycled through. Note that during switching of the test signal, only the out-of-band frequencies of the test signal are affected, and none of the in-service channels or optical data signals are affected. Note also that all switching in the ROADM should be one-to-one; that is, although multiple test signal transmitters will be transmitting at once, no more than one test signal should appear at any particular internal port at any given time.

In an example of synchronous operation, a first ROADM block has a first test signal transmitter and a second ROADM block has a second test signal transmitter. The first test signal transmitter and the second test signal transmitter are configured to synchronize transmission of their respective outgoing test signals to begin transmission from respective internal ports at a same time. FIG. 4 shows a timing chart, showing test signals transmitted by Degree 1, which can represent the first ROADM block in this example, and Degree N, which can represent the second ROADM block. The internal ports used for transmitting the test signal are represented by ρ, with Degree 1 having internal ports $\rho_{1,1}$ through $\rho_{1,L}$, and Degree N having internal ports $\rho_{N,1}$ through $\rho_{N,L}$. In this example, the test signal monitor is in an Add/Drop M having internal ports $d_{M,1}$ through $d_{M,K}$. Degree 1 transmits a test signal having a signature of $S_{1,1}$ through internal port $\rho_{1,1}$ during a same period of time that Degree N transmits a test signal having a signature of $S_{N,1}$ through internal ports $\rho_{N,1}$. During this period of time, the test signal monitor of the Add/Drop M block cycles through each of its internal ports $d_{M,1}$ through $d_{M,K}$, checking each one for a test signal. If a test signal is detected, the unique signature of the test signal will allow the test signal monitor, or an associated controller, to determine from which internal port of which ROADM block the test signal was received.

In some implementations of synchronous operation, the second test signal monitor is configured to monitor each of a second plurality of internal ports for a first duration of time $1/f_L$, and the first test signal transmitter is configured to inject a respective outgoing test signal into each of the first plurality of internal ports for a second duration of time $1/f_K$, where the second duration of time is equal to or greater than the first duration multiplied by a number of the second plurality of internal ports K.

Figure 5:
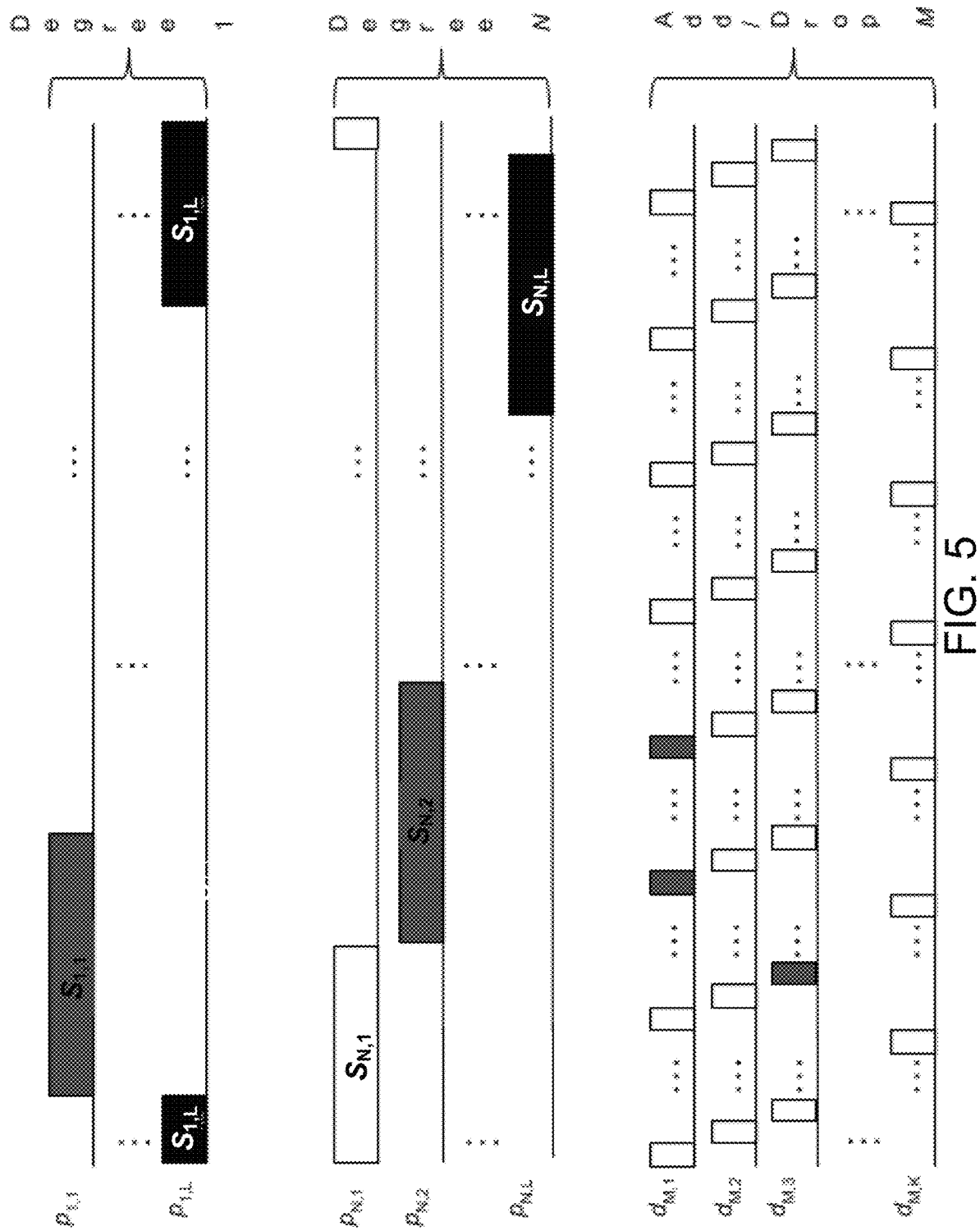
FIG. 5 is a timing diagram of a ROADM performing connectivity verification testing in an asynchronous mode, according to an illustrative implementation.

FIG. 5 is a timing diagram of a ROADM performing connectivity verification testing in an asynchronous mode, according to an illustrative implementation. In asynchronous mode, there need be no fixed relationship between the timing of each test signal transmitter. This can reduce the complexity of the system by eliminating the need for communicating timing information between ROADM blocks or test signal transmitters. FIG. 5 shows that the beginning and end of transmission of respective test signals from internal ports of different ROADM blocks (e.g., Degree 1 and Degree 2) are not aligned in time. In asynchronous operation, the relationship between the frequency with which the test signal monitor cycles through internal ports for transmission of the test signal $f_L$, and the frequency with which the test signal transmitter cycles through internal ports for detection of the test signal $f_K$ is: $f_L \leq f_K/(2K)$.

In an example of asynchronous operation, a first ROADM block has a first test signal transmitter and a second ROADM block has a second test signal transmitter. The first test signal transmitter and the second test signal transmitter are configured to begin and end transmission of their respective outgoing test signals through respective internal ports at a different time. The two test signal transmitters are not required to cycle through respective internal ports at different times, nor do such implementations require any control or communication to ensure un-aligned timing. It is simply assumed that in absence of control of timing, that the respective timings of different test signal transmitters will not be aligned in time.

In some implementations of asynchronous operation, the second test signal monitor is configured to monitor each of a second plurality of internal ports for a first duration of time $1/f_L$, and the first test signal transmitter is configured to inject a respective outgoing test signal into each of the first plurality of internal ports for a second duration of time $1/f_K$, where the second duration of time is equal to or greater than twice the first duration multiplied by a number of the second plurality of internal ports K.

FIG. 6 a flowchart of an example method 600 of performing connectivity verification testing and topology discovery in a reconfigurable optical add/drop multiplexer (ROADM), according to an illustrative implementation. The method 600 includes injecting a first outgoing test signal having a first signature into a first internal port of a first ROADM block (stage 610). The method 600 includes injecting a second outgoing test signal having a second signature into a second internal port of the first ROADM block (stage 620). The method 600 includes monitoring for an incoming test signal at each of the internal ports (stage 630). The method 600 includes verifying, based on receiving the incoming test signal at a third internal port, that a valid first connection exists between the third internal port and an internal port of a second ROADM block (stage 640).

The method 600 includes injecting a first outgoing test signal having a first signature into a first internal port of a first ROADM block (stage 610). The ROADM block can be, for example the ROADM degree 110 or add/drop block 120 previously described. A test signal transmitter, such as the test signal transmitter 240 previously described, can generate the outgoing test signal. A switch of the ROADM block, such as the WSS blocks 225 or switch 320 previously described, can route the outgoing test signal to the desired internal port.

The method 600 includes injecting a second outgoing test signal having a second signature into a second internal port of the first ROADM block (stage 620). The second outgoing test signal can be generated by the same test signal generator, but during a different period of time. The second signature is different from the first signature, such that a receiving test signal monitor can determine from which internal port the outgoing test signal originated. In some implementations, the receiving test signal monitor can determine optical loss of the signal in the path monitored. The timing of switching the outgoing test signal, and its associated signature, between the internal ports of the ROADM block was described previously with reference to FIGS. 4 and 5.

The method 600 includes monitoring for an incoming test signal at each of the internal ports (stage 630). The ROADM block can include a test signal monitor, such as the test signal monitor 240. The switch can switch between the internal ports to allow the test signal monitor to check each internal port in turn for the presence of the incoming test signal. The timing of switching the internal port connected to the test signal monitor as it relates to the timing of transmitting outgoing test signals through the internal ports of the ROADM block was described previously with reference to FIGS. 4 and 5.

The method 600 includes verifying, based on receiving the incoming test signal at a third internal port, that a valid first connection exists between the third internal port and an internal port of a second ROADM block (stage 640). The test signal monitor, or a controller associated with the test signal monitor, can determine, based on an incoming test signal received at a particular internal port, and based on the signature of the incoming test signal, that a good connected exists between the particular internal port, and an internal port of the same or another ROADM block associated with the signature of the incoming test signal.

In some implementations, the method 600 can include maintaining, by a controller of the second ROADM block, state information regarding ROADM connections. The method 600 can include issuing an alert if a state of the ROADM connections changes. In some implementations, the controller is configured to provide a report indicating how to obtain a desired state of ROADM connections.

In some implementations, the method 600 can include instructing, by a controller of the second ROADM block, the test signal monitor to initiate a test and provide a report of state information regarding ROADM connections to the controller.

In some implementations, the method 600 can include a second ROADM block having a second test signal monitor monitoring for the first outgoing test signal at each of a second plurality of internal ports. The method 600 can include verifying, by the second test signal monitor based on receiving the first outgoing test signal having the first signature at a second internal port of the second plurality of internal ports, that a valid second connection exists between the second internal port of the second plurality of internal ports and the first internal port of the first plurality of internal ports. In some implementations, the first ROADM block is a ROADM degree, and the second ROADM block is an add/drop block.

Figure 7:
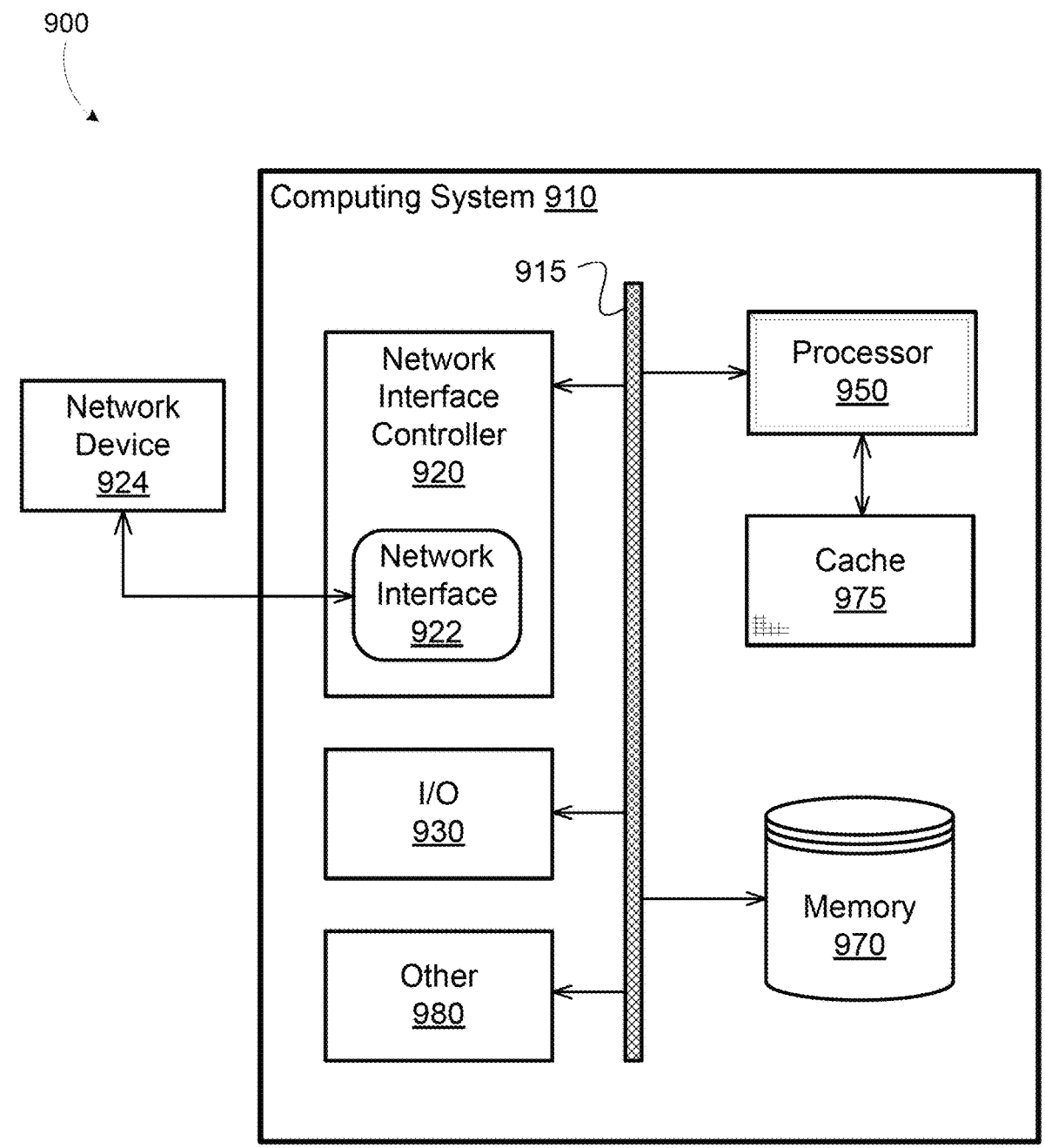
FIG. 7 is a block diagram illustrating a general architecture for a computer system that may be employed to implement elements of the systems and methods described and illustrated herein, according to an illustrative implementation.

FIG. 7 is a block diagram illustrating a general architecture for a computer system 900 that may be employed to implement elements of the systems and methods described and illustrated herein, according to an illustrative implementation. The computing system 900 may be utilized in implementing the methods of operating, for example, a ROADM 100 shown in FIGS. 1-3, or any component thereof including the controller 180 and other blocks/modules.

In broad overview, the computing system 910 includes at least one processor 950 for performing actions in accordance with instructions and one or more memory devices 970 or 975 for storing instructions and data. The illustrated example computing system 910 includes one or more processors 950 in communication, via a bus 915, with at least one network interface controller 920 with one or more network interface ports 922 connecting to one or more network devices 924, memory 970, and any other devices 980, e.g., an I/O interface. Generally, a processor 950 will execute instructions received from memory. The processor 950 illustrated incorporates, or is directly connected to, cache memory 975.

In more detail, the processor 950 may be any logic circuitry that processes instructions, e.g., instructions fetched from the memory 970 or cache 975. In many embodiments, the processor 950 is a microprocessor unit or special purpose processor. The computing device 900 may be based on any processor, or set of processors, capable of operating as described herein. In some implementations, the processor 950 can be capable of executing the methods of performing connectivity verification testing and topology discovery in a ROADM shown in FIG. 6. The processor 950 may be a single core or multi-core processor. The processor 950 may be multiple processors. In some implementations, the processor 950 can be configured to run multi-threaded operations. In some implementations, the processor 950 may host one or more virtual machines or containers, along with a hypervisor or container manager for managing the operation of the virtual machines or containers. In such implementations, the method 600 shown in FIG. 6 can be implemented within the virtualized or containerized environments provided on the processor 950.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 900 may have any number of memory devices 970. In some implementations, the memory 970 can include instructions corresponding to the method of performing connectivity verification testing and topology discovery in a ROADM shown in FIG. 6. In some implementations, the memory 970 supports virtualized or containerized memory accessible by virtual machine or container execution environments provided by the computing system 910.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interfaces 922 (also referred to as network interface ports). The network interface controller 920 handles the physical and data link layers of the OSI model for network communication. In some implementations, some of the network interface controller's tasks are handled by the processor 950. In some implementations, the network interface controller 920 is part of the processor 950. In some implementations, a computing system 910 has multiple network interface controllers 920. The network interfaces 922 are connection points for physical network links. In some implementations, the network interface controller 920 supports wireless network connections and an interface port 922 is a wireless receiver/transmitter. Generally, a computing device 910 exchanges data with other network devices 924 via physical or wireless links to a network interfaces 922. In some implementations, the network interface controller 920 implements a network protocol such as Ethernet.

The other network devices 924 are connected to the computing device 910 via a network interface port 922. The other network devices 924 may be peer computing devices, network devices, or any other computing device with network functionality. For example, a first network device 924 may be a network device such as a hub, a bridge, a switch, or a router, connecting the computing device 910 to a data network such as the Internet.

The other devices 980 may include an I/O interface, external serial device ports, and any additional co-processors. For example, a computing system 910 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 900 includes an additional device 980 such as a coprocessor, e.g., a math co-processor can assist the processor 950 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an internetwork (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A system for performing connectivity verification testing and topology discovery in a reconfigurable optical add/drop multiplexer (ROADM) comprising:
   a first ROADM block of a plurality of ROADM blocks, wherein each ROADM block is a ROADM degree or an add/drop block, the first ROADM block including:
   a first plurality of internal ports including at least a first internal port, a second internal port, and a third internal port, each connected to another ROADM block via respective optical fibers;

a test signal transmitter configured to inject a first outgoing test signal having a first signature into the first internal port and a second outgoing test signal having a second signature different from the first signature into the second internal port, wherein the first outgoing test signal and second outgoing test signal are out-of-band of optical data signals traversing the ROADM; and a test signal monitor configured to monitor for incoming test signals at each of the plurality of internal ports, wherein the test signal monitor is configured to:

validate, based on a signature of an incoming test signal received at the third internal port of the first ROADM block, that a first connection exists between the third internal port of the first ROADM block and a first internal port of a second plurality of internal ports of a second ROADM block.

2. The system of claim 1, wherein:

the second ROADM block includes a second test signal monitor configured to monitor for the first outgoing test signal at each of the second plurality of internal ports; and the second test signal monitor is configured to:

verify, based on receiving the first outgoing test signal having the first signature at a second internal port of the second plurality of internal ports, that a second connection exists between the second internal port of the second plurality of internal ports and the first internal port of the first plurality of internal ports.

3. The system of claim 2, wherein: the first ROADM block is a ROADM degree, and the second ROADM block is an add/drop block.

4. The system of claim 1, wherein:

the test signal transmitter is a first test signal transmitter configured to transmit first transmitted test signals;

the second ROADM block has a second test signal transmitter configured to transmit second transmitted test signals; and the first test signal transmitter and the second test signal transmitter are configured to synchronize transmission of the first transmitted test signals and the second transmitted test signals to begin transmission from respective internal ports at a same time.

5. The system of claim 4, wherein:

the second ROADM block includes a second test signal monitor configured to monitor each of the second plurality of internal ports for a first duration of time; and the first test signal transmitter is configured to inject a respective outgoing test signal into each of the first plurality of internal ports for a second duration of time equal to or greater than the first duration multiplied by a number of the second plurality of internal ports.

6. The system of claim 1, wherein:

the test signal transmitter is a first test signal transmitter configured to transmit first transmitted test signals;

the second ROADM block has a second test signal transmitter configured to transmit second transmitted test signals; and the first test signal transmitter and the second test signal transmitter are configured to begin and end transmission of the first transmitted test signals and the second transmitted test signals through respective internal ports at a different time.

7. The system of claim 6, wherein:

the second ROADM block includes a second test signal monitor configured to monitor each of the second plurality of internal ports for a first duration of time; and the first test signal transmitter is configured to inject a respective outgoing test signal into each of the first plurality of internal ports for a second duration of time equal to or greater than twice the first duration multiplied by a number of the second plurality of internal ports.

8. The system of claim 1, wherein:

the first signature is amplitude or phase modulated onto an optical carrier of the first outgoing test signal at a frequency of less than 100 MHz, and the second signature is amplitude or phase modulated onto an optical carrier of the second outgoing test signal at a frequency of less than 100 MHz.

9. The system of claim 1, wherein:

the first plurality of internal ports includes a fourth internal port and a fifth internal port;

the test signal transmitter is configured to inject a third outgoing test signal having a third signature different from the first signature and the second signature into the fourth internal port; and the test signal monitor is configured to monitor for the third outgoing test signal at each of the first plurality of internal ports and verify, based on receiving the third outgoing test signal at the fifth internal port, that a loopback connection exists between the fourth internal port and the fifth internal port.

10. The system of claim 1, wherein:

the first ROADM block is in a first building and the second ROADM block is a second building separate and distinct from the first building.

11. The system of claim 1, wherein:

the first ROADM block was provided by a first vendor and the second ROADM block was provided by a second vendor different from the first vendor.

12. The system of claim 1, wherein the second ROADM block includes a controller configured to maintain state information regarding ROADM connections and issue an alert if a state of ROADM connections changes.

13. The system of claim 12, wherein the controller is configured to provide a report indicating how to obtain a desired state of ROADM connections.

14. The system of claim 1, wherein the first ROADM block includes a controller configured to instruct the test signal monitor to initiate a test and provide a report of state information regarding ROADM connections to the controller.

15. The system of claim 1, wherein the test signal monitor measures an amplitude of the test signal and indicates a misconnection if an amplitude of the test signal is below a threshold.

16. A method of performing connectivity verification testing and topology discovery in a reconfigurable optical add/drop multiplexer (ROADM), the method comprising:

injecting, using a test signal transmitter of a first ROADM block of a plurality of ROADM blocks, a first outgoing test signal having a first signature into a first internal port of a first plurality of internal ports and a second outgoing test signal having a second signature different from the first signature into a second internal port of the first plurality of internal ports, wherein the first outgoing test signal is out-of-band of optical data signals traversing the ROADM;

monitoring, using a test signal monitor of the first ROADM block, for an incoming test signal at each of the plurality of internal ports, and;

verifying, based on receiving the incoming test signal at a third internal port of the first plurality of internal ports, that a first connection exists between the third internal port of the first plurality of internal ports and a first internal port of a second plurality of internal ports of a second ROADM block, wherein each of the first internal port, the second internal port, and the third internal port of the first plurality of internal ports is connected to another ROADM block via a respective optical fiber.

17. The method of claim 16, further comprising:

monitoring, by the second ROADM block having a second test signal monitor, for the first outgoing test signal at each of the second plurality of internal ports; and verifying, by the second test signal monitor based on receiving the first outgoing test signal having the first signature at a second internal port of the second plurality of internal ports, that a second connection exists between the second internal port of the second plurality of internal ports and the first internal port of the first plurality of internal ports.

18. The method of claim 17, wherein:

the first ROADM block is a ROADM degree, and the second ROADM block is an add/drop block.

19. The method of claim 16, wherein:

the test signal transmitter is a first test signal transmitter configured to transmit first transmitted test signals;

the second ROADM block has a second test signal transmitter configured to transmit second transmitted test signals; and the first test signal transmitter and the second test signal transmitter are configured to synchronize transmission of the first transmitted test signals and the second transmitted test signals to begin transmission from respective internal ports at a same time.

20. The method of claim 19, wherein:

the second ROADM block includes a second test signal monitor configured to monitor each of the second plurality of internal ports for a first duration of time; and the first test signal transmitter is configured to inject a respective outgoing test signal into each of the first plurality of internal ports for a second duration of time equal to or greater than the first duration multiplied by a number of the second plurality of internal ports.

21. The method of claim 16, wherein:

the test signal transmitter is a first test signal transmitter configured to transmit first transmitted test signals;

the second ROADM block has a second test signal transmitter configured to transmit second transmitted test signals; and the first test signal transmitter and the second test signal transmitter are configured to begin and end transmission of the first transmitted test signals and the second transmitted test signals through respective internal ports at a different time.

22. The method of claim 21, wherein:

the second ROADM block includes a second test signal monitor configured to monitor each of the second plurality of internal ports for a first duration of time; and the first test signal transmitter is configured to inject a respective outgoing test signal into each of the first plurality of internal ports for a second duration of time equal to or greater than twice the first duration multiplied by a number of the second plurality of internal ports.

23. The method of claim 16, wherein:

the first signature is amplitude or phase modulated onto an optical carrier of the first outgoing test signal at a frequency of less than 100 MHz, and the second signature is amplitude or phase modulated onto an optical carrier of the second outgoing test signal at a frequency of less than 100 MHz.

24. The method of claim 16, wherein the first plurality of internal ports includes a fourth internal port and a fifth internal port, the method comprising:

injecting, using the test signal transmitter, a third outgoing test signal having a third signature different from the first signature and the second signature into the fourth internal port;

monitoring, using the test signal monitor, for the third outgoing test signal at each of the first plurality of internal ports; and verifying, based on receiving the third outgoing test signal at the fifth internal port, that a loopback connection exists between the fourth internal port and the fifth internal port.

25. A non-transitory computer-readable medium having stored thereon instructions configured to cause one or more processors to execute a method of performing connectivity verification testing and topology discovery in a reconfigurable optical add/drop multiplexer (ROADM), the method comprising:

injecting, using a test signal transmitter of a first ROADM block of a plurality of ROADM blocks, a first outgoing test signal having a first signature into a first internal port of a first plurality of internal ports and a second outgoing test signal having a second signature different from the first signature into a second internal port of the first plurality of internal ports, wherein the first outgoing test signal is out-of-band of optical data signals traversing the ROADM;

monitoring, using a test signal monitor of the first ROADM block, for an incoming test signal at each of the plurality of internal ports, and;

verifying, based on receiving the incoming test signal at a third internal port of the first plurality of internal ports, that a first connection exists between the third internal port of the first plurality of internal ports and a first internal port of a second plurality of internal ports of a second ROADM block, wherein each of the first internal port, the second internal port, and the third internal port of the first plurality of internal ports is connected to another ROADM block via a respective optical fiber.

* * * * *